3,211,809
TRANSPARENT POLYMERIC STYRENE-ARYL-OLEFIN COMPOSITIONS HAVING HIGH IMPACT STRENGTH AND PROCESS FOR PREPARING SAME

Giulio Natta, Enrico Beati, and Febo Severini, Milan, Italy, assignors to Montecatini, Soc. Gen. per l'Industria Mineraria e Chimica, Milan, Italy, a corporation of Italy
No Drawing. Filed Aug. 2, 1960, Ser. No. 46,907
Claims priority, application Italy, Aug. 7, 1959, 13,504/59
9 Claims. (Cl. 260—877)

The present invention relates to transparent polymeric styrene compositions having high impact strength and to a process for preparing such polymers.

Heretofore it has been known that the brittleness of polystyrene can be reduced by polymerizing styrene in the presence of elastic substances such as e.g. natural rubber or synthetic rubbers such as polybutadiene, rubbery copolymers of butadiene and styrene, rubbery butadiene-acrylonitrile copolymers, etc.

It is also known that polymeric styrene compositions having a high impact strength and exhibiting properties which do not vary remarkably with time (as opposed to high-impact strength polystyrenes prepared by polymerizing styrene in the presence of rubbers) can be obtained by polymerizing styrene in the presence of linear aliphatic poly-alpha-olefins having a high molecular weight, and more particularly in the presence of peroxidic derivatives of said polyolefins.

However, polymeric styrene compositions obtained according to the above-described processes exhibit poor transparency as compared to normal polystyrene. In general, such polymeric styrene compositions are opaque masses having a white color.

In addition, it is known that polymeric styrene compositions having high impact strength, such compositions being obtained by polymerizing styrene in the presence of 1,2-enchained polymers of butadiene or of other conjugated diolefins, unlike the high impact-strength polystyrene compositions obtained by polymerizing styrene in the presence of poly-alpha olefins, are translucent masses.

It is an object of this invention to provide a method of preparing polymeric styrene compositions having high impact strength, good hardness, and which also are highly transparent.

Additional objects will become apparent hereinafter.

We have surprisingly found that by polymerizing and grafting styrene onto a peroxidized derivative of a high molecular weight amorphous-linear head-to-tail polymer or copolymer, this polymer or copolymer consisting substantially of arylolefinic monomeric units having the general formula

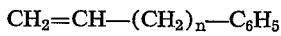

$$CH_2=CH-(CH_2)_n-C_6H_5$$

wherein $n$ is a positive integer from 1 to 6, materials are obtained having high impact strength and very good hardness, which materials also possess high transparency in comparison with the known products obtained by polymerization and grafting styrene in conjunction with peroxidic derivatives of aliphatic hydrocarbons.

The peroxidized arylolefin polymer, when dissolved in styrene, tends to decompose at temperatures above 50° C., thereby forming free radicals and acting as a polymerization catalyst. Most of the polymeric styrene chains formed by the action of the free radicals are grafted onto the polymeric aryl-olefin chain used, and the product thus obtained possesses a remarkably high impact strength. The decrease in brittleness is closely correlated to the formation of polymeric styrene chains grafted onto the peroxidized polymer chains used.

Our method for preparing the improved polymeric styrene compositions of our invention comprises polymerizing styrene at a temperature between about 50 and 120° C. in the presence of a peroxide-derivative of a substantially linear amorphous non-crystallizable polymer or copolymers of an aryl-substituted olefin having the formula

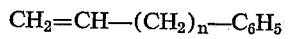

$$CH_2=CH-(CH_2)_n-C_6H_5$$

wherein $n$ is a positive integer between 1 and 6.

The amount of peroxidized arylolefin polymer or copolymer dissolved in the styrene may vary within wide limits, e.g. from 5 to 20% of peroxidized arylolefin polymer or copolymer in the styrene solution. A preferred range is from 10 to 15%.

The amount of oxygen present in the peroxidic form which is present in the aryl olefin polymer may also vary within wide limits. In general, for polymers having an intrinsic viscosity (determined in toluene at 75° C.) between about 0.2 and 1, the peroxidic oxygen content should be between about 0.1 and 1.0% by weight.

Instead of a polymer of such an aryl olefin, a copolymer containing, together with monomeric units deriving from the aforementioned alpha-olefins, a minor component of ethylene or a different alpha-olefin can also be used.

Polymeric styrene with high impact strength and very high transparency can be obtained by using allyl benzene polymers for the grafting. However, to further improve the impact strength, we prefer to use an arylolefin polymer of the aforementioned type wherein $n$ is an integer from 2 to 5. For example, a polystyrene grafted onto peroxidized 3-phenyl-propene-1 is perfectly transparent but exhibits only a slightly improved impact strength, whereas the grafting of a polystyrene onto 5-phenyl-pentene-1 results in a polymeric product which is transparent and presents a very good impact strength. The present invention may be carried out starting with an amorphous polymer or copolymer obtained by polymerization of one or more monomers of the aforedescribed type with the aid of a catalyst, e.g., consisting of a titanium or vanadium halide and of an alkyl aluminum compound (Belgian Pattern No. 538,782). The polymer or copolymer, having an intrinsic viscosity, determined in toluene at 75° C., between about 0.2 and 1, is peroxidized by treatment with an oxygen containing gas according to known methods. The peroxidized polymer is dissolved in monomeric styrene, preferably under a nitrogen atmosphere, and the clear solution thus obtained, when heated to a temperature between about 50 and 120° C., polymerizes with the resultant formation of polystyrene chains grafted onto chains of the aryl substituted olefin used.

The polymerization may be carried out in block, in emulsion, or in suspension.

The polymerization time may vary from about 5 to 100 hours, depending on the temperature, the peroxidic group content, and the desired degree of conversion.

The following example will further illustrate our invention. All parts are by weight unless otherwise indicated.

Example (a) A solution containing 12 g. of head-to-tail 5-phenyl-pentene-1 polymer (having an intrinsic viscosity of 0.8, as determined in tetrahydronaphthalene at 135° C.) in 400 ml. of cumene are introduced into a 12-liter stainless-steel agitating autoclave. 15 ml. of methanol are added to the solution. The mixture is heated to 93° C. and air is pumped into the autoclave until a pressure of 13 atmospheres is reached. The oxygen absorption is permitted to continue until the pressure descreases to 12.5 atmospheres. The polymer precipitated from the solution by methanol addition, separated from the solvent, and purified, has a peroxidic oxygen content of 0.3%.

(b) 12 g. of poly-5-phenyl-pentene-1 peroxidized as described in (a) and having an intrinsic visocity of 0.45 (determined in toluene at 75° C.) are dissolved in 88 g. of styrene. The mixture, heated to 90° C. for 50 hours, polymerizes as a block. A hard, easily machined, transparent mass, having an impact strength of 16 kg.-cm./cm.$^2$ and a Rockwell hardness, Scale L, of 80, is obtained.

(c) 100 g. of freshly distilled styrene containing 0.2 g. of benzoyl peroxide are polymerized under the same conditions as (b) above, but in the absence of peroxidized poly-5-phenyl-pentene-1, by heating to 90° C. for 50 hours. A hard transparent mass presenting an impact strength of only 5 kg.-cm./cm.$^2$ and a Rockwell hardness, Scale L, of 90, is obtained. (The impact strengths shown in this example are determined on unnotched specimens having a size of 3 x 12.75 x 125 mm. with a Charpy pendulum apparatus.)

Variations can of course be made without departing from the spirit of our invention.

Having thus described our invention, what we desire to secure and claim by Letters Patent is:

1. A polymeric styrene composition having a high impact strength and transparency, this composition comprising the reaction product obtained at a temperature of from about 50 to 120° C. by polymerizing styrene and a peroxide-containing amorphous linear polymer selected from the group consisting of peroxide-containing homoplymers and peroxide-containing copolymers of an aryl olefin of the formula $$CH_2=CH-(CH_2)_n-C_6H_5$$

wherein $n$ represents a positive integer from 1 to 6 with and alpha-olefin.

2. The polymeric composition of claim 1 wherein the peroxide-containing aryl olefin polymer has an intrinsic viscosity, as determined in toluene at 75° C., between about 0.2 and 1.0.

3. The polymeric composition of claim 2 wherein the said peroxide-containing aryl olefin polymer has an oxygen content from 0.1 to 1.0 percent by weight.

4. The polymeric composition of claim 1 wherein the peroxide-containing polymer is present in an amount from about 5 to 20% by weight.

5. The polymeric composition of claim 1 wherein the peroxide-containing polymer is present in an amount from about 10 to 15% by weight.

6. The polymeric composition of claim 1 wherein the peroxide-containing linear aryl olefin polymer is poly-5-phenyl-pentene-1.

7. A process for preparing transparent polymeric styrene composition having a high impact strength, this process comprising heat polymerizing styrene at a temperature of from about 50 to 120° C. in the presence of a peroxide-containing a substantially linear amorphous, non-crystallizable polymer selected from the group consisting of peroxide-containing homopolymers and peroxide-containing copolymers of an aryl olefin of the formula $$CH_2=CH-(CH_2)_n-C_6H_5$$

wherein $n$ is a positive integer from 1 to 6.

8. The process of claim 7 wherein the polymerization of styrene is carried out in the presence of a peroxide-containing linear amorphous 5-phenyl-pentene-1 polymer dissolved in styrene in an amount from about 5 to 20% by weight before polymerization.

9. The process of claim 8 wherein the peroxide-containing polymer used has an oxygen content between about 0.1 and 1.0% by weight and an intrinsic viscosity, determined in toluene at 75° C., between about 0.2 and 1.

References Cited by the Examiner
UNITED STATES PATENTS

| | | | |
|---|---|---|---|
| 2,837,496 | 6/58 | Vandenberg | 260—877 |
| 2,842,531 | 7/58 | Baxter | 260—93.5 |

LEON J. BERCOVITZ, *Primary Examiner.*

D. ARNOLD, *Examiner.*